US012351432B2

(12) United States Patent
Bowerman et al.

(10) Patent No.: US 12,351,432 B2
(45) Date of Patent: Jul. 8, 2025

(54) MODULAR LIFT SYSTEM FOR BUILDING CORES

(71) Applicant: Laing O'Rourke PLC, Dartford (GB)

(72) Inventors: Hugh Bowerman, Woking (GB); Karl Wilkinson, Hertford (GB)

(73) Assignee: Laing O'Rourke PLC, Dartford (GB)

( * ) Notice: Subject to any disclaimer, the term of this patent is extended or adjusted under 35 U.S.C. 154(b) by 0 days.

(21) Appl. No.: 18/250,148

(22) PCT Filed: Oct. 19, 2021

(86) PCT No.: PCT/EP2021/078909

§ 371 (c)(1),
(2) Date: Apr. 21, 2023

(87) PCT Pub. No.: WO2022/084294

PCT Pub. Date: Apr. 28, 2022

(65) Prior Publication Data

US 2023/0382689 A1 Nov. 30, 2023

(30) Foreign Application Priority Data

Oct. 23, 2020 (GB) ..................................... 2016875

(51) Int. Cl.
*B66B 19/00* (2006.01)
*B66B 7/02* (2006.01)
(Continued)

(52) U.S. Cl.
CPC .......... *B66B 19/00* (2013.01); *B66B 11/0005* (2013.01); *B66B 7/02* (2013.01);
(Continued)

(58) Field of Classification Search
CPC ........ B66B 11/005; B66B 19/00; B66B 19/04
See application file for complete search history.

(56) References Cited

U.S. PATENT DOCUMENTS 11,780,706 B2 * 10/2023 Wang ...................... B66B 19/00 187/250
2012/0073214 A1 3/2012 Sie
(Continued)

FOREIGN PATENT DOCUMENTS

BE 568738 A 7/1958
CN 102583130 A * 7/2012
(Continued)

OTHER PUBLICATIONS

Machine Translation of CN 102583130.*
(Continued)

*Primary Examiner* — Diem M Tran
(74) *Attorney, Agent, or Firm* — Stoel Rives LLP

(57) ABSTRACT

The present disclosure relates to a method and apparatus for the construction of a lift within a shaft. In a first aspect of the disclosed technology, there is provided a method for installing a modular lift within a shaft, comprising the steps of: inserting a frame of the lift within the shaft, the frame comprising one or more stabilisers; adapting the one or more stabilisers to contact an internal face of the shaft; wherein the frame is held in position by the forces exerted through the stabilisers.

14 Claims, 9 Drawing Sheets

(51) Int. Cl.
*B66B 11/00* (2006.01)
*B66B 11/02* (2006.01)
*B66B 13/30* (2006.01)

(52) U.S. Cl.
CPC ............... *B66B 7/023* (2013.01); *B66B 11/02* (2013.01); *B66B 13/30* (2013.01)

(56) References Cited

U.S. PATENT DOCUMENTS

| | | | | |
|---|---|---|---|---|
| 2018/0237269 | A1 | 8/2018 | Witczak et al. | |
| 2022/0274804 | A1* | 9/2022 | Li | E04B 1/5831 |

FOREIGN PATENT DOCUMENTS

| | | | | | |
|---|---|---|---|---|---|
| CN | 107117517 | A | * | 9/2017 | |
| CN | 107399656 | A | * | 11/2017 | B66B 11/00 |
| CN | 208531965 | U | * | 2/2019 | |
| CN | 109665414 | A | * | 4/2019 | B66B 1/365 |
| CN | 209226353 | | | 8/2019 | |
| CN | 111591858 | A | * | 8/2020 | |
| EP | 2559647 | A1 | | 2/2013 | |
| WO | 2018192735 | A1 | | 10/2018 | |
| WO | WO-2022103795 | A1 | * | 5/2022 | B66B 11/0005 |
| WO | WO-2023134842 | A1 | * | 7/2023 | B66B 11/0005 |

OTHER PUBLICATIONS

Machine Translation of CN 208531965.*

Combined Search and Examination Report under Sections 17 and 18(3) for GB Application GB2016875.3 dated Mar. 24, 2021, p. 5.

International Search Report and Written Opinion for PCT Application PCT/EP2021/078909 dated Jan. 31, 2022, p. 13.

First Examination Report for EP Application 21798322 dated May 14, 2024, p. 5.

Second Examination Report for EP Application 21798322 dated Feb. 5, 2025, pp. 1-4.

* cited by examiner

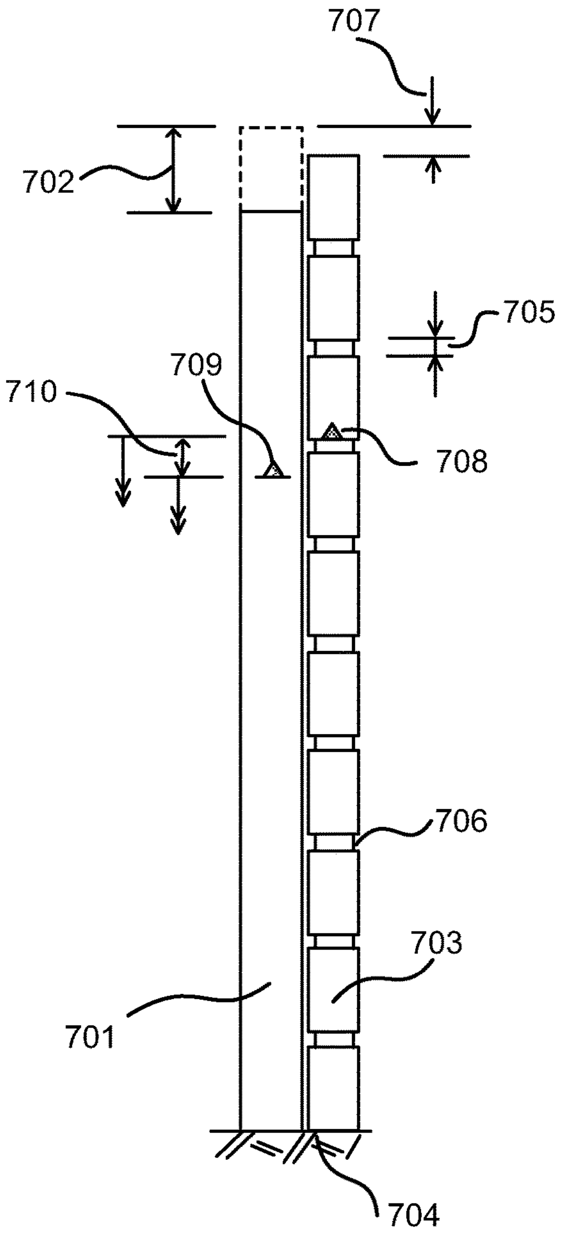
FIG. 7A
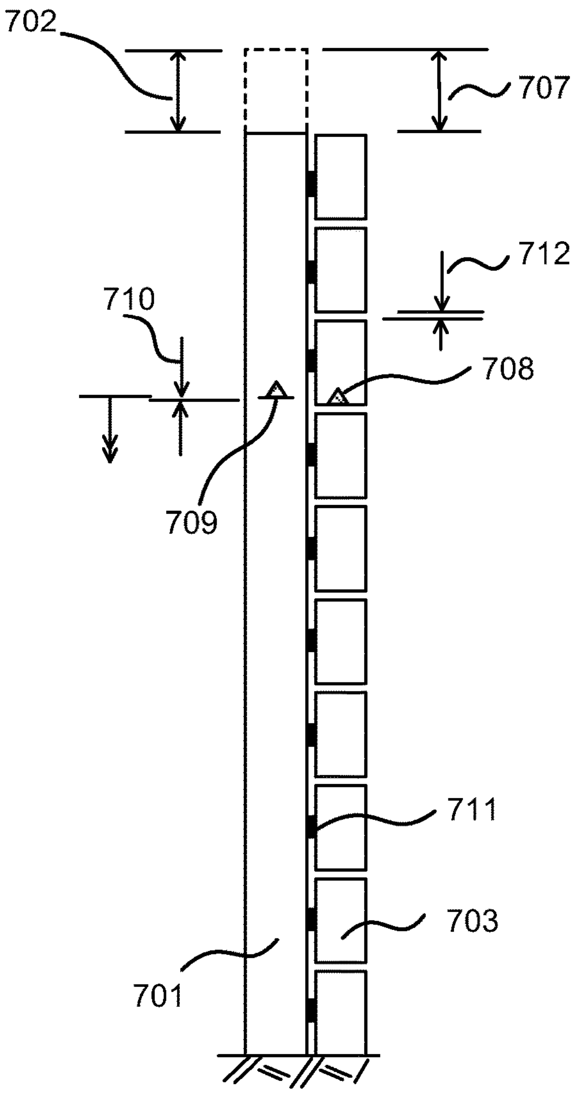
FIG. 7B
FIG. 7

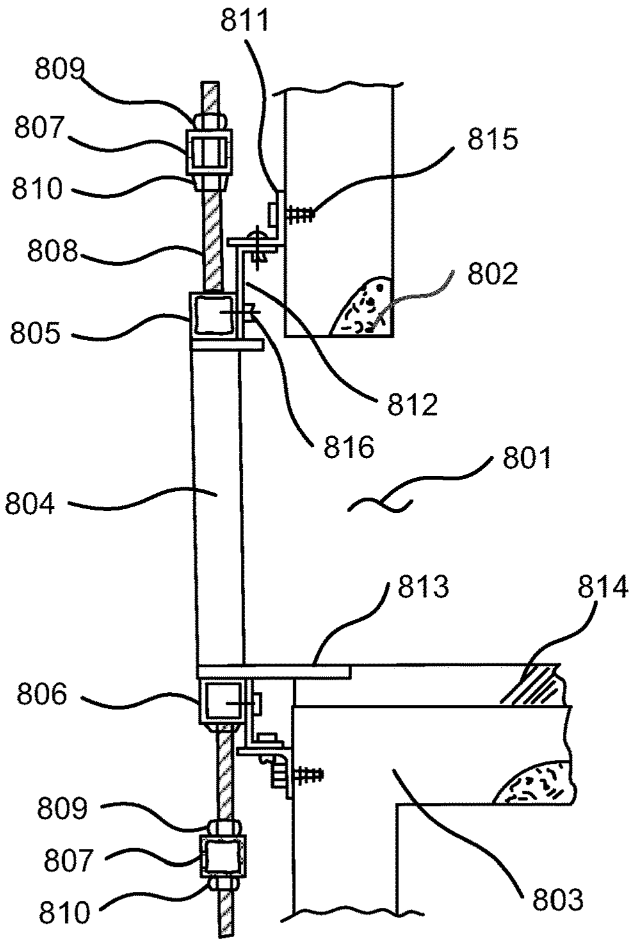
FIG. 8A
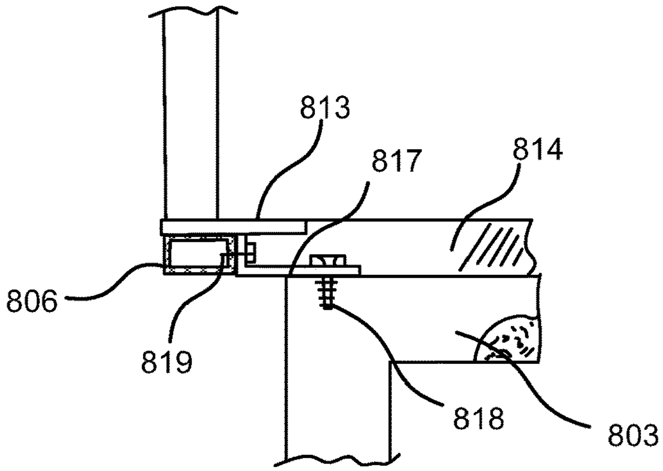
FIG. 8B
FIG. 8

MODULAR LIFT SYSTEM FOR BUILDING CORES

This application is a US National Stage of PCT Application No. PCT/EP2021/078909 filed Oct. 19, 2021, which claims priority to GB Application No. 2016875.3 filed Oct. 23, 2020, which are incorporated herein by reference, in their entirety, for any purpose.

The present disclosure relates to a method and apparatus for the construction of a lift within a shaft.

BACKGROUND

Many tall buildings have a concrete core running vertically up from the foundation to the top of the building. Vertical shafts run up through this core. Some of these shafts are used for lifts. A lift shaft is typically equipped with vertically continuous guide rails on which the lift car and counter-weight run and a door set at each storey. Guide rails are positioned to high accuracy. They are secured to the concrete walls of the shafts by adjustable brackets. At each storey there is a door-sized structural opening associated with a landing. A landing side lift door set closes off the opening. This door set is fixed to the inside of the concrete shaft by adjustable brackets. Landing side doors must be accurately positioned so that the lift car doors running within the shaft runs close to but do not touch them.

The accuracy with which a concrete lift shaft is typically constructed is within set limits, typically within circa+/−25 mm of a theoretically perfect centreline, i.e., the plan geometric centre of each shaft at each storey should lie no more than 25 mm from the design intended centreline running up the shaft. This requires brackets securing guide rails and door assemblies to have an adjustable range of 50 mm. This increases bracket size, taking up valuable space within the shaft.

The conventional method of installing guide rails is as follows:

1) Wait until the shaft construction is completed. Survey the shaft to determine the centreline to be used for setting out the guide rails and doors. Due to tolerances, this is not necessarily the design intended centreline;
2) Install a raiseable access platform in the bottom of the shaft. Working up the shaft, progressively install guide rail and door brackets;
3) Once brackets are installed and approximately aligned, install the guide rails. Fine adjust the brackets so that the guide rails are accurately positioned relative to the centreline; and
4) Repeat for the doors.

Due to the confined space within a shaft combining with issues of working at height, conventional lift system installation is a relatively slow process. As a result, fit out of the lift shaft is typically on the critical path of a project. This means that the lift only becomes available for use towards the end of construction. As such it has no value in providing access up the building during the construction process. Furthermore, as construction sites seek to move more work from site to factory, the lift shaft fit-out remains an activity that is stubbornly tied to site.

The examples described herein are not limited to examples which solve problems mentioned in this background section.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a first aspect of the disclosed technology, there is provided a method for installing a modular lift within a shaft, comprising the steps of: inserting a frame of the lift within the shaft, the frame comprising one or more stabilisers; adapting the one or more stabilisers to contact an internal face of the shaft; wherein the frame is held in position by the forces exerted through the stabilisers.

The method and apparatus disclosed herein is intended to considerably speed up the installation of lifts in new or existing lift shafts. It also removes much of the site activity back into the factory. This gives greater flexibility in construction planning by removing lift installation from the critical path. Further, by enabling the lift to be operational much earlier in a project, improved access to the higher storey's in a building is achieved during construction. This allows quicker movement around the building, improving productivity and further reducing the construction programme. By being in contact with the concrete, when the lift equipment tries to move, e.g., due to the dynamics of the lift car moving up and down the shaft, then the forces the car generates are reacted to by the stabilisers, thereby preventing the frame from moving.

Optionally, the frame comprises a plurality of stabilisers, optionally arranged in an orthogonal orientation in relation to a longitudinal axis of the frame.

The stabilisers protrude from the frame at an adjustable distance. This distance is set such that they contact the shaft core. This limited attachment of the lightweight frame to the concrete core results in a significant increase in the stiffness of the frame.

Optionally, frame comprises one or more of: guide rail brackets; guide rails; door brackets; and/or door sets.

Such components allow for a lift car to be fitted within the frame, and suitable for users to access. The frame may move vertically in accurate alignment with doors aligning accurately to give safe access for users.

Optionally, the frame comprises a vertical adjustment mechanism.

Owing to tolerances in concrete construction, and other inaccuracies inherent in any building project including those that manifest over a time duration, the frame may require vertical adjustment in order to align the doors with the appropriate openings in the shaft. The length of adjustment provided by, say, a threaded bar must accommodate both long term vertical movement and construction tolerances.

Optionally, the frame further comprises one or more brackets operable to fix the frame to the internal face of the shaft. Optionally, the method as disclosed herein comprises the further step of: inserting a subsequent frame of the lift within the shaft, the subsequent frame comprising one or more stabilisers and one or more brackets; adjusting one or more vertical connecting elements to fix the subsequent frame in vertical alignment with the frame; adapting the one or more stabilisers to contact an internal face of the shaft; fixing the subsequent frame to an internal face of the shaft using one or more brackets, wherein the subsequent frame is held in position by the forces exerted through the one or more brackets; and removing the one or more vertical connecting elements.

It is appreciated that this method is a part of a modular system. Should a longer shaft be required to be traversed by lift, then one or more further frames can be inserted into the same shaft adjacent any previously inserted frames. This provides a method of accommodating the axial shortening that can occur in a lift core. Subsequent frames may be vertically adjusted to the correct position, whilst taking temporary vertical support from a lower frame. The vertically adjusted frames may then be fixed to the lift core wall so that vertical forces in the frame are transferred to the core. The temporary vertical supports to the lower frame can then be removed, so that the vertically adjacent frames can move vertically relative to each other.

Optionally, the one or more stabilisers comprise either separately or in combination one or more of: a pad screwed out from the frame; a pad screwed out from the frame with an adhesive applied to the pad; a glue and/or screw angle bracket between the frame and the shaft; and/or a slotted hole assembly comprising one or more sliding parts.

The stabilisers, also referred to as fixings, can take many forms, including simple pads, noting that they are providing stiffness (stopping something moving) rather than strength. The stabilisers may be infinitely adjustable, according to the individual requirements of the lift under construction.

Optionally, the frame further comprises a lift car.

In use, the lift arrangement will comprise a lift car, inside which users travel between floors of a building. The location of the lift car in the frame influences how the initial installation may proceed, and so it can be advantageous to include a car during the installation process. If the lift car is at the bottom of the frame, then it obstructs access to guide the frame onto the lift pit template. It also prevents subsequent access to adjust the first frame to vertical should there be tolerance issues. The lift car may therefore be advantageously positioned one storey up the frame, enabling access to the lift pit template to make fine adjustments to achieve frame verticality.

Optionally, the shape of the frame remains substantially unchanged during the installation process.

Frames and associated equipment may be accurately set up in a factory ahead of installation within a shaft. In such a case, the frame requires sufficient strength and stiffness to hold these items in the correct position relative to each other during transport and installation.

Optionally, the one or more stabilisers are further operable to exert sufficient pressure on the internal face of the shaft so as to adjust the frame to a predetermined shape.

Although frames and associated equipment may be accurately set up in a factory ahead of installation within a shaft, the frame may be distorted by different gravitational or other forces being applied during transit. In such cases, the frame may require restoration to its intended shape as calibrated in the factory. Such restoration may be provided by using the one or more stabilisers to push against the inner surface of the shaft with sufficient force to reshape the frame.

According to a further aspect, there is provided a frame for a modular lift, comprising: one or more stabilisers operable to contact an internal face of a shaft; wherein in use the frame is held in position by the forces exerted through the stabilisers. Optionally, the frame further comprises one or more fittings for: one or more guide rail brackets; one or more guide rails; one or more door brackets; one or more door sets.

In order to perform the installation as disclosed herein, a frame is required which is suitable for the purpose of installing a lift within a shaft. Such a frame can provide the advantages and features as disclosed herein.

Optionally, the height of the frame is between 6 metres to 12 metres.

This is the typical height of the frame being used, and may be transported using standard road transportation. Other heights are available.

Optionally, the frame further comprises rollers and/or skids.

Rollers or skids which project slightly from the frame may be used to keep parts of the frame assembly, e.g., the doors, from contacting the walls of the shaft and hence being damaged during assembly when lowered from a crane down the shaft.

To enable an upper frame that is being lowered to correctly engage with an already installed lower frame without the need for manual positioning, a three stage guidance system may be used. Stage 1 of this three stage guidance system may comprise a coarse guidance that brings the frame being lowered into alignment within the accuracy of the stage 2 guidance system. This guidance is achieved before the stage 2 guidance system becomes engaged. The stage 2 guidance brings the two frames into more accurate alignment, typically to within the accuracy of a dowel located in a hole with a predetermined clearance. Stage 3 guidance comprises lowering onto the dowel system. Stage 3 guidance is generally fully engaged before any of the equipment items installed within the upper and lower frames come into close proximity or contact with each other. Stage 1 guidance is typically provided by inclined steel members permanently or removably attached to the top or bottom of the frame. Stage 2 guidance is typically provided by cones on the top of dowels and in the lead-in to holes. Stage 1 guidance is typically provided by a small clearance hole running over a dowel, wherein a dowel is optionally in the form of a threaded bar.

Optionally, the frame has a rectangular cross section.

This is the typical shape for a frame in plan view. This provides an efficiently sized enclosure for a conventional lift car, which shares a similar shape in cross section in plan view. This frame shape can be easily constructed compared to other shapes, and reinforced with diagonal or cross braces to conform to the required stiffness.

Optionally, the frame further comprises one or more access platforms. Optionally, the one or more access platforms provide reinforcement to the structure of the frame.

Platforms are useful within a lift arrangement in order to access different parts of the various assemblies. Preferably, removal of a platform is non-destructive so that platforms can be re-used. By attaching platforms to the frame by e.g., friction grip bolts, they can be used to help lock-in the shape of the module during transport and installation. The additional bracing they provide may be used to reduce the member sizes in the permanent frame. The access platform may be pre-fitted in such a way that it acts as a temporary stiffening element to the frame during transport and installation.

Optionally, the frame is substantially made of one or more of: steel; aluminium; and/or fibre reinforced composite.

Steel can provide a relatively inexpensive but sufficiently stiff material from which a frame may be constructed. It is of course appreciated that other materials may also be suitable either individually or in combination, if they impart the required physical properties to the frame.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

BRIEF DESCRIPTION OF THE DRAWINGS

FIGS. 7A and 7B shows a two lift arrangements within the same concrete core;

FIGS. 8A and 8B show different fixing arrangements;

Figure 1:
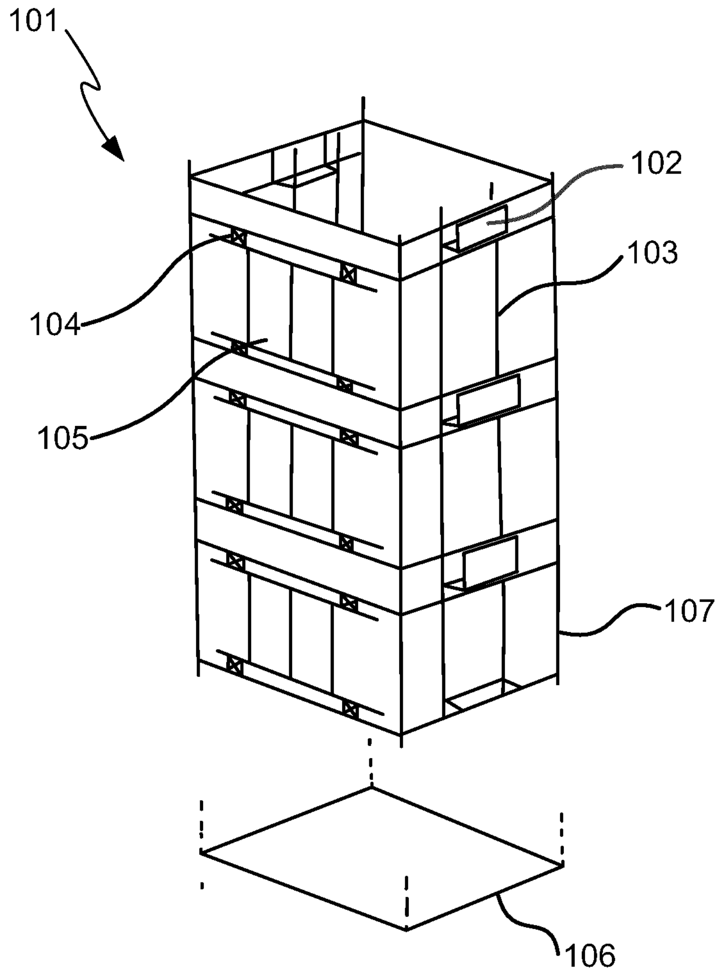
FIG. 1 shows an exemplary frame for a lift.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

FIG. 1 of the accompanying drawings shows exemplary frame for a lift, which in this example comprises a light weight but accurate steel frame 101 onto which guide rail brackets 102, guide rails 103, door brackets 104 and door sets 105 are fitted. The frame has sufficient strength and stiffness to hold these items in the correct position relative to each other during transport and installation. Frames and associated equipment are accurately set-up in the factory. It is appreciated that other materials than steel may be used, as long as they provide sufficient strength and stiffness to hold the abovementioned items in the correct position relative to each other during transport and installation.

In use the frames stand vertically, typically between 2 and 4 storeys high. This height exceeds transportation limits, and the frames are therefore transported horizontally. For residential buildings typical storey heights are circa 3 metres, and therefore a frame may be 4 storeys high and still fit on a flatbed trailer. For commercial buildings storey heights can vary between 3.5 metres and 4 metres and only 3 storeys will fit on a flatbed trailer.

Figure 2:
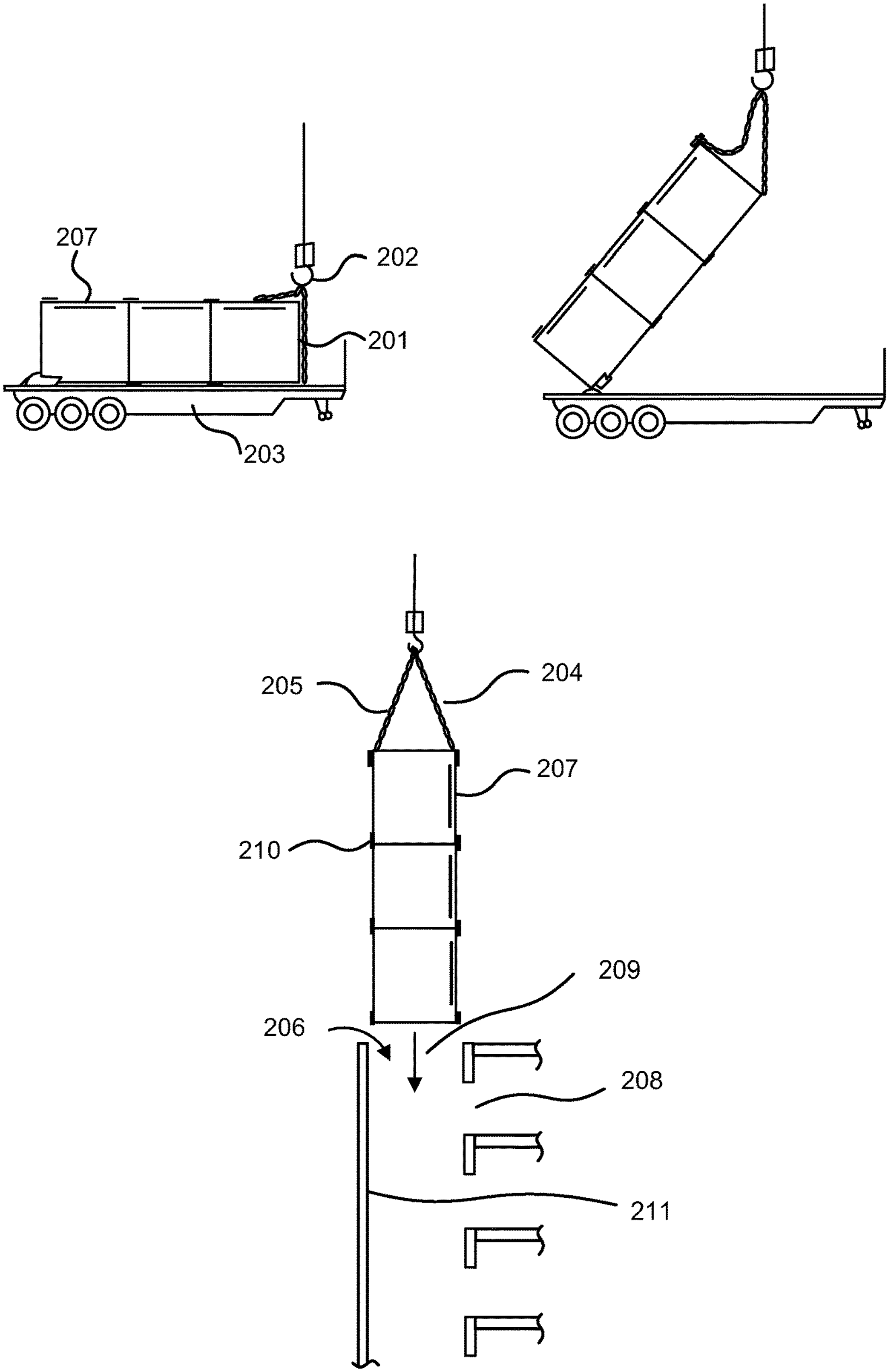
FIG. 2 shows an installation process for the frame of FIG. 1.

At site, the upper end of the steel frame 201 is attached to a crane hook 202 as shown in FIG. 2. The frame is upended as it is lifted off the trailer 203. Chain lengths 204, 205 are set so that the frame hangs vertically. The frame is then moved so that it lies vertically above the lift shaft opening 206. The frame is rotated about its vertical axis so that the doors 207 align with the landing structural openings 208. The crane then lowers 209 the frame so that it enters the shaft. Rollers or skids 210 projecting slightly from the frame may be used to keep, e.g., the doors, from contacting the walls of the shaft 211. Maintaining hook plan position, the crane lowers the frame down the shaft.

Figure 3:
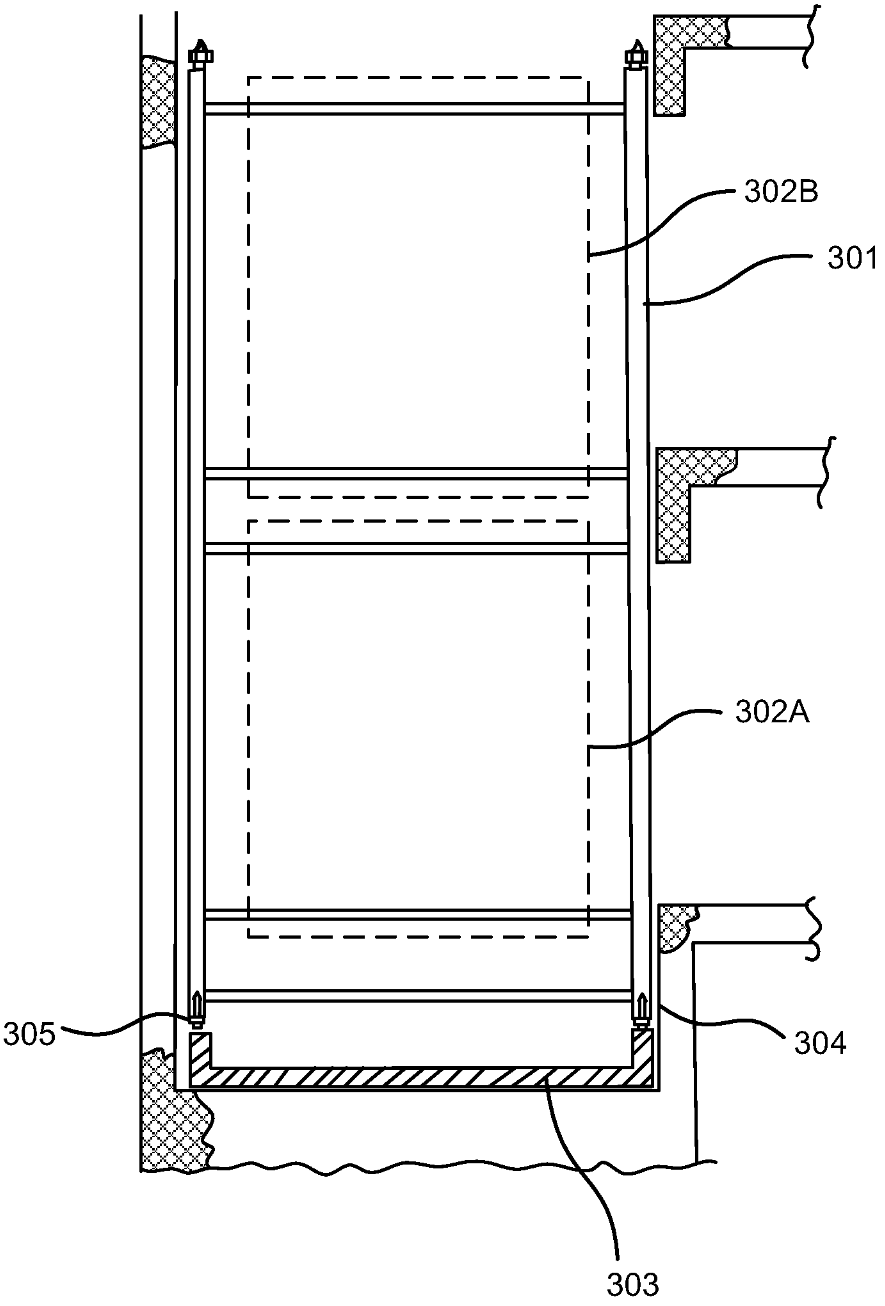
FIG. 3 is a schematic cross-sectional diagram of a frame and shaft for a lift.

In FIG. 3, the first frame 301 to be installed may also contain the lift car 302. This can be locked in position to prevent it sliding along the guiderails. The first frame 301 sits on a lift pit starter template 303. This can be pre-installed in the lift pit 304. It comprises a means 305 of setting the vertical position of the lower frame. It also positions the lower frame in plan position and orientation. This will be relative to the agreed vertical axis of the lift shaft, and hence it can be important to accurately set the starter template.

The location of the lift car 302 in the first frame 301 influences how the initial installation may proceed. If the lift car 302*a* is at the bottom of the frame, then it obstructs access to guide the frame onto the lift pit template 303. It also prevents subsequent access to adjust the first frame to vertical should there be tolerance issues. The lift car is therefore advantageously positioned one storey up 302*b* the first frame, enabling access to the lift pit template to make fine adjustments to achieve frame verticality.

Figure 4:
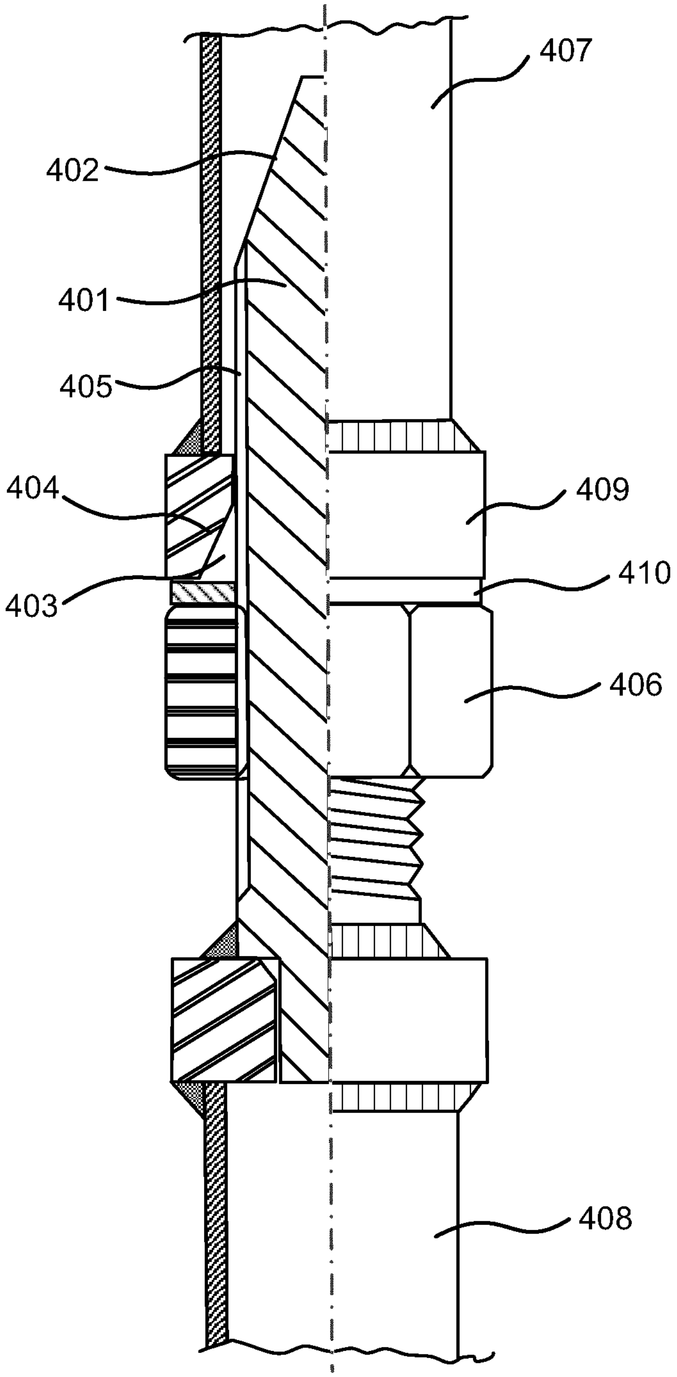
FIG. 4 is an enlarged view of a corner member of the frame.

A frame is typically rectangular in plan 106. At each corner there is a vertical running member 107. Each corner member 107, 407 is fitted with a dowel 401 with a sloping lead-in 402 at the top and a hole 403 to receive the dowel of a lower frame (or lift pit template) 408 at the bottom. As shown in FIG. 4, dowels 401 are typically round with a conical lead-in 402. The lead-in provided by the dowel will typically not be enough to ensure that a frame lowered down a shaft automatically engages. The hole 403 at the bottom of a corner member may additionally be provided with a lead-in cone 404, or the apparatus necessary to employ the use of Stage 1 guides as described herein.

The dowels typically have a male thread 405, for example M30. A standard M30 nut 406 is run on this. As an upper frame 407 descends onto a lower frame 408, the cone 402 on the lower M30 dowel enters the hole 403 on the upper frame. The upper frame lowers until plate 409 on the bottom of corner member 407 rests on nut 406. A washer 410 is optionally used to bridge over hole 403.

The above arrangement exists at each corner. Synchronised rotation of the nuts at each corner enables the frame to be raised or lowered. By rotating the nuts on opposite sides in a different sense, the verticality of the frame may be adjusted. By appropriate adjustment the top of the frame may be brought into a position where it is located in the correct plan position and orientation by the dowels, set at the correct height for the lift doors relative to the landings, and adjusted exactly to vertical, in which state no other part of the frame should be in contact with the shaft.

When adjusted as described above, the frame of at least one embodiment maintains the same shape as it had when guide rails and door sets were aligned in the factory. This will ensure that lift doors are correctly positioned relative to the guide rails, and that guide rails on vertically adjacent frames line up. Shape is preserved by designing the frame so that when it is rotated from horizontal to vertical it substantially maintains shape, under the effect of gravity acting in a different direction or any other forces being applied.

If in certain circumstances the shape cannot be maintained to the required accuracy, the frame still carries the lift equipment into the shaft, where the stabilisers may be used to restore the frame to the intended shape. In such an embodiment where the frame subsides when rearranged such that the shape of the frame changes, the one or more stabilisers operable to contact an internal face of a shaft can be used to exert sufficient pressure on said internal face so as to re-adjust the frame back to the predetermined shape.

Figure 5:
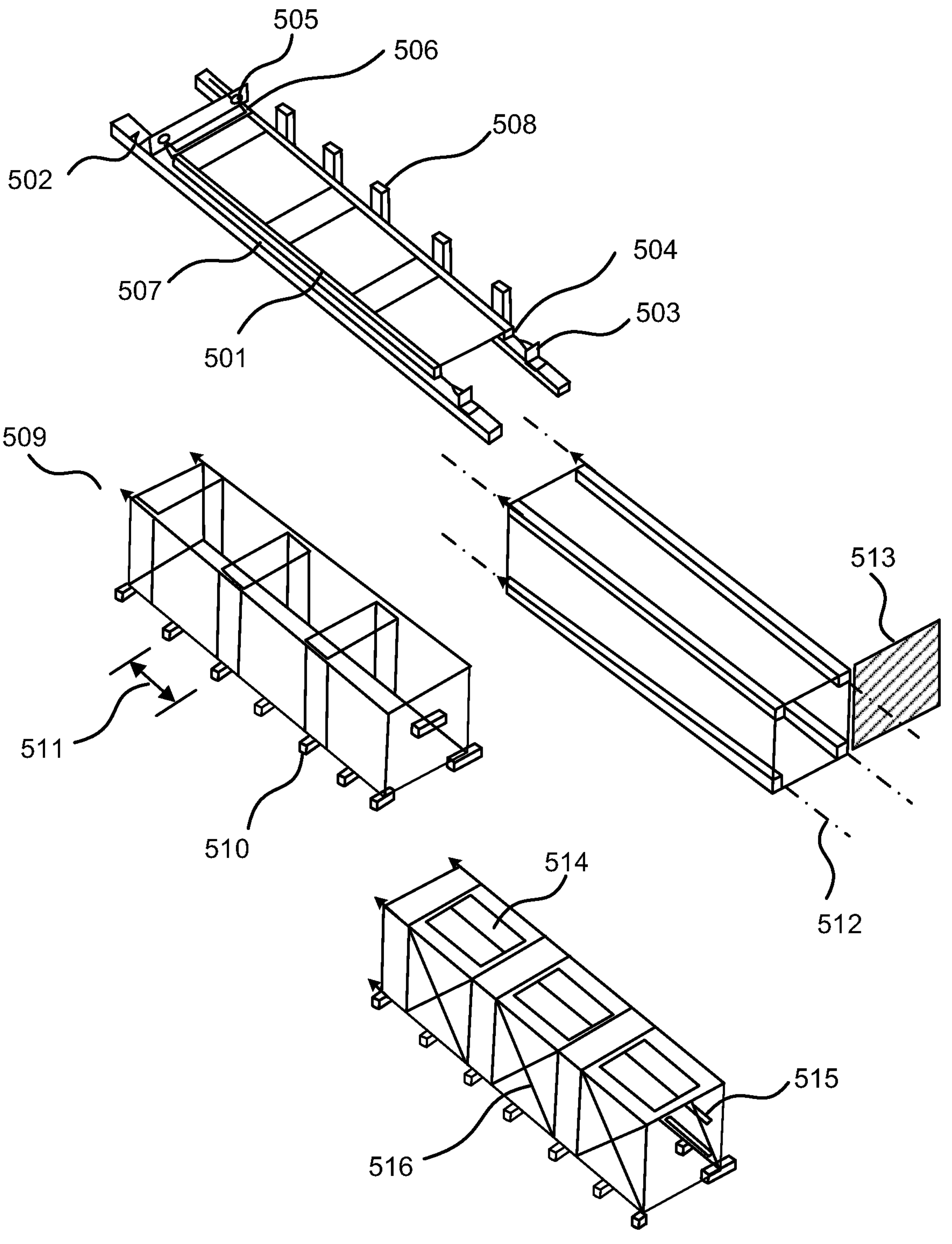
FIG. 5 shows an exemplary assembly process for the frame.

In FIG. 5, side frames 501 are made accurately on a fixture 502 with due care taken to balance welds so that weld shrinkage causes minimal distortion. Fixture 502 typically comprises slidable pins 503 for accurately engaging in holes 504 at the bottom of a corner member, slidable holes 505 for accurately engage with threaded dowels 506 at the top of a corner member, base rail 507 to maintain flatness and side stops 508 to maintain straightness.

Side frames 501 are assembled together to form a horizontal box 509. The box is assembled in the same orientation that it will be in when equipment is installed, e.g. door side up. This is the same orientation that the box should be transported in.

The box may be supported at regular intervals on pads 510 that have been levelled to high accuracy. Whenever any further work is done on the box it should be supported at the same locations on pads having a similar level of accuracy, ideally the same pads.

The spacing 511 of pads 510 must be sufficiently close that gravity effects do not cause significant deflections between support points.

Equipment should be installed and accurately set relative to the centrelines 512 defined by the centre of the top dowels 506 and bottom holes 504. A datum plane 513 is defined by the underside of plates 409. These are the datums that the module installs to, and are used for setting out.

Once equipment 514, 515 has been installed and aligned, diagonal or cross braces 516 should be fitted as clearances permit in order to lock in the shape. These should be sized to provide a restraining effect greater than any distortions that may occur due to gravity loads.

Where the apparatus as disclosed herein is used to retrofit existing shafts, if the same sized lift car is to be used as the original, then the metal frame may have only a very limited or even no space to sit within. New-build shafts could use a larger shaft to make space, but this will push up overall core size and potentially reduce lettable area. The frame is therefore beneficially designed to take up as little space within the shaft as possible, using dead spaces that don't interfere with the lift equipment. Given these space restrictions, the frame is relatively slender and will only have limited stiffness when lift car forces are applied in the horizontal direction, for example when restraining the position of the guide rails. The result is distortions to the steel frame. Contrast this to the concrete lift core which has an abundance of stiffness.

Conventional practise would involve extensive setting out and drilling of holes in order to position brackets accurately and secure them to the concrete. If the same were now repeated to secure the frame to the concrete core, then a significant amount of installation effort is re-introduced.

Figure 6:
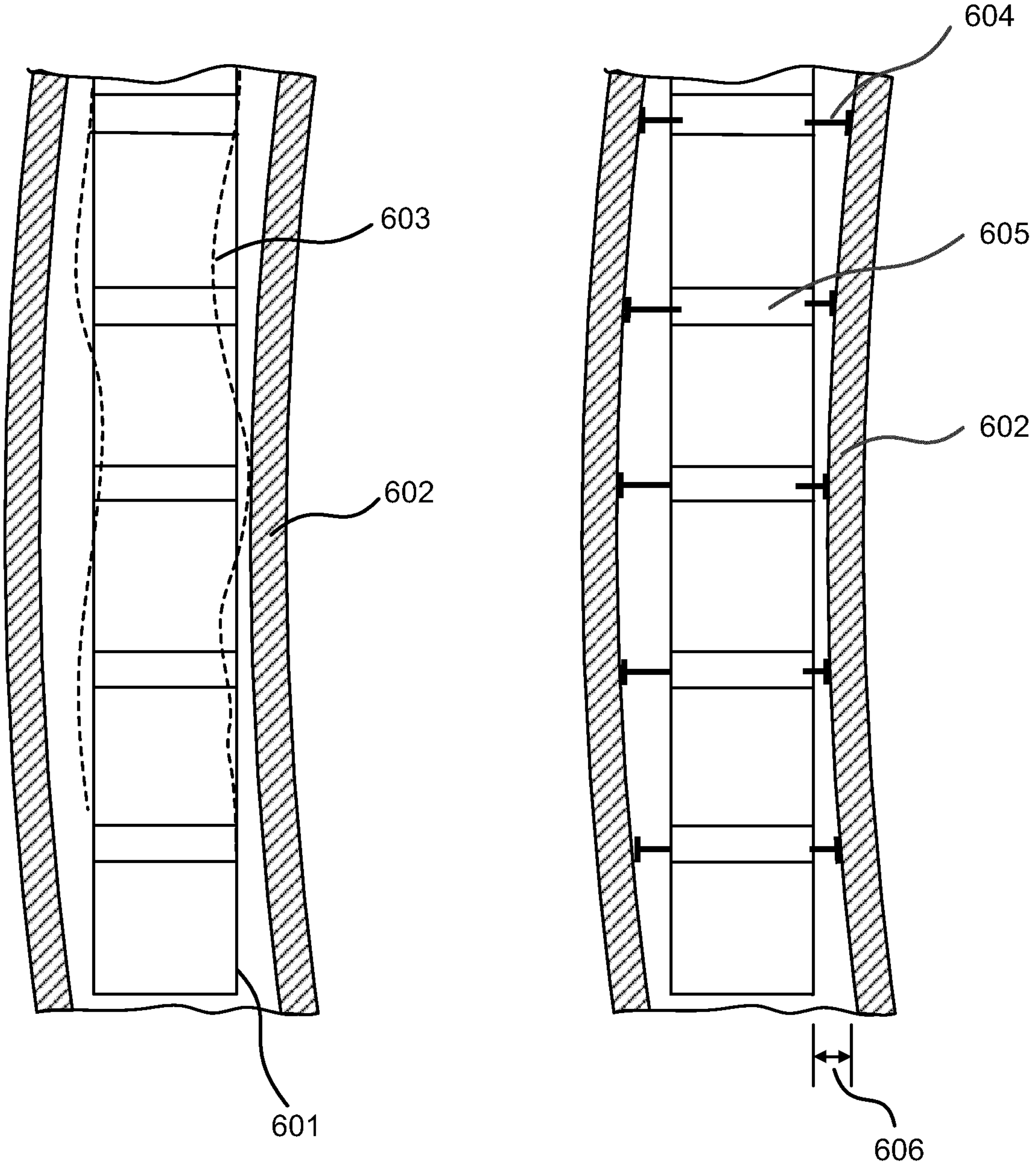
FIG. 6 shows a cross-section view of a frame within a bowing shaft.

One aspect of the proposed arrangement is the recognition that only limited attachment of the lightweight steel frame to the concrete core results in a significant increase in the stiffness of the steel frame. In FIG. 6A a slender steel frame 601 is installed in a bowing shaft 602. Due to slenderness, under vertical and side loads the steel frame may bend as shown by the dashed line 603. In FIG. 6B stabilisers, in the form of adjustable pads 604, have been added at each horizontal frame level 605. Located towards the plan corners, the stabilisers 604 are wound out so that they just contact the core 602. These adjustable stabilisers are arranged to transfer vertical forces to the core. This may be done in orthogonal plan directions. Despite core 602 being bowed, frame 601 retains the shape locked in during assembly 500 and the plan shape is effectively fixed. Repeating this at each plan frame locks the steel box in position. Since the stabilisers are variable, the varying tolerance gap 606 between frame and core is accommodated without applying any distortion to steel frame 601, and the intent of setting everything accurately in the factory and transferring this accuracy to site has been achieved. Furthermore, the horizontal stiffness of the frames has effectively assumed that of the core, and sway as shown by 603 is impossible. Where mid-side horizontal or bending forces are applied to the frame from the guide rails (for example, due to their eccentricity from the side frames), additional adjustable stabilisers may be used.

These infinitely adjustable stabilisers or fixings can take many forms, noting that they are providing stiffness (stopping something moving) rather than strength. Their forms include: a simple pad screwed out as described above; as above, but with an adhesive applied to the pad in order to further increase stiffness and provide tensile capacity (75 dia pad, 1 MPa adhesive design stress=>4.5 kN design capacity); glue and or screw angle bracket between steel frame and concrete shaft (tension and compression; relatively small fixing); and/or slotted hole assemblies with sliding parts.

Returning to the installation, the steel frame has been set accurately in position and should not be in contact with the shaft at any position. The next stage is to gain access to the shaft to set the stabilisers or brackets. This may be achieved by installing a platform from each landing. It will be apparent that the vertical positions of all brackets etc. need to be positioned so that they do not coincide with the floor of this platform, else it will not be possible to set brackets from either above or below. The platform should ideally cantilever from the landing and not impose deformations on the frame.

An option is to use the roof of the lift car as an access platform. This requires the lift car to be progressively raised. It will be noted that the lift car is running on the guide rail of an un-stabilised module. If the crane is used to raise the lift car, then any crash decks installed to protect workers will need to be removed each time the lift car is to be raised.

Another option is to pre-install access platforms in the frame. These can be used to advantageously help lock-in the shape during installation.

The above process of installing a module can then be repeated for each steel frame. In this manner the lift equipment in a multi-storey core can be rapidly installed. So far no consideration has been given to the effects of vertical loads nor to differential vertical movements between the frames and concrete core. If not addressed, these can have a profound effect, especially on the door thresholds.

Consider first the cumulative load in the corner member of each steel frame. This may be different for each corner, resulting in different stresses. If one corner has twice the load of another, the differential vertical movement between corner columns at say floor 40 of a 40 storey building could be 30+mm. Only a proportion of this can be adjusted out. The detrimental effect will be to distort modules, potentially putting doors and guide rails out of alignment. Further, the cumulative load in the corner member of each steel frame may be significantly higher at floor zero than say floor 40. Floor zero will therefore govern the sizing of the corner members. An option is to use the same corner member size all the way up the building. This achieves standardisation of design, but is inefficient as most corner members end up being oversized. The other option is to vary the size of the corner member, but this results in multiple steel frame designs. This can create problems pre-setting door levels and finishing threshold and rebate details. This is because as more frames are stacked onto lower frames, so the additional weight of the upper frames causes the corner members to shorten under load, changing the vertical position of the already installed lower doors. Door final vertical adjustment could be left until all frames have been installed, but as door adjustment requires access back in the shaft, this will slow installation.

A second issue arises from the axial shortening of a concrete core over time. This results from: elastic shortening due to increasing load as the building progresses; creep shortening under continuous load which can be rapid at first, reducing over time; and/or shrinkage due to excess water in the concrete drying out over time.

The magnitude of these movements is liable to vary over time. A total value from the moment the concrete is cast until a mature age could be as high as 4 mm per storey. It is noted that quite a lot of this movement occurs early on and more typical movements from time of lift installation forwards would be circa 2 mm per storey for a new core. Where a lift is being retrofitted into an existing core the vertical movement after lift installation would be negligible. In a new-build tall building (40 storeys) movements of 30+mm could occur during installation in the steel and 80 mm after installation in the concrete. Where advantage is taken to install the frames immediately after the core has been cast, higher relative movements are possible.

These magnitudes of vertical movement will be seen at landings since the landing side lift doors are attached to the steel frame. Relative movements measured in tens of mm are possible between the door-set and the landing level. This is well in excess of what a threshold detail can be expected to accommodate.

The vertical movement issue is illustrated with reference to FIGS. 7A and 7B. In FIG. 7A concrete lift core 701 shortens by dimension 702, say 120 mm. Lift frames 703 are stacked from base 704. The vertical gap 705 between frames is fixed such that load is transferred through the vertical connecting elements 706. Under their own self weight, frames 703 shorten elastically by dimension 707, for example 40 mm. At the top of the lift shaft there is a differential vertical movement represented by dimension 702 minus dimension 707. Further down the shaft, two positions 708 and 709 that are nominally at the same level have deflected vertically by different amounts resulting in a differential vertical deflection 710. This differential deflection can be many 10's of mm. It will be apparent that 708 could correspond to the threshold of a door attached to lift frame 703 whilst 709 could correspond to the associated landing in the core.

In FIG. 7A one point in time is represented. For the lift frames 703 that deflect elastically, deflection 707 is substantially non-changing with time. In contrast core 701 is subject to time related vertical movement due to creep and shrinkage. This results in dimension 702 varying (increasing) with time. It will be apparent that differential vertical deflection 710 is not constant, and that through time it will increase.

FIG. 7B shows the same concrete core 701 with a stack of the same lift frames 703. In this case each lift frame has been vertically attached to core 701 via bracket 711. Vertical connecting elements 706 have been removed so that vertically adjacent lift frames can move relative to each other. The result is that dimension 712 will reduce as the concrete core shortens. The vertical connecting elements 706 of a different embodiment may be loosened, rather than removed, provided that the vertically adjacent lift frames can move relative to each other.

The benefit of this approach can be seen by comparing the relative vertical positions of 708 and 709. Taking bracket 711 to be mid-height of the frame, the differential vertical movement 710 between positions 708 and 709 will be approximately equivalent to the concrete shortening over half a frame height. Assuming door thresholds are set when their remains 2 mm/storey of concrete shortening to occur, the maximum value of this differential vertical movement is 3 mm. By setting the lift frame side door initially 1.5 mm high, the differential vertical deflection 701 will initially reduce from 1.5 mm towards zero before increasing again to 1.5 mm low. These magnitudes of differential deflections can be accommodated by typical threshold details.

FIGS. 7A and 7B represent two approaches to dealing with the vertical movement issue. In the method of FIG. 7A it is impractical to leave the lift frame door set moving vertically with the steel frame due to the magnitude of the differential movement. It is therefore necessary to transfer the fixity of the doors to the concrete core and detach it from the steel frame. FIG. 8 shows schematically how this is achieved.

In FIG. 8A a landing door opening 801 sits under concrete core wall 802 and landing slab 803. Door-set 804 comprising top member 805 and bottom member 806 is attached to the lift frame 807 by threaded bar 808. Backing off nuts 810 and rotating nuts 809 allows door-set 804 to be moved up and down relative to frame 807. Note that at this stage angles 811 and 812 at top and bottom are not fitted. Nuts 809 are adjusted until threshold 813 is at the appropriate level relative to finishing screed 814. At this stage door-set 804 is supported off lift frame 805. To transfer support to the concrete core 802, angles 811 and 812 are fitted. This involves drilling and fixing 815 and bolting and screwing 816. Angles 811 and 812 have a combination of round and slotted holes to enable the bracket to be correctly set to bridge the variable gap between the frame and the concrete wall. Once all angles and fixing have been fitted and tightened, the door-set 804 needs to be released vertically. This is achieved by backing-off nuts 809 and 810 such that the door-set 804 can run vertically free relative to frame 807.

It will be apparent that access for fixing angles brackets 811 and 812 is poor. Also, the fixings are from within the core and will typically be close to any floor platform accessed from the landing. Two exemplary options are disclosed to speed up installation:

The first option is to only use the bottom bracket set. Threaded bar 808 runs in a close fitting hole in frame member 807 so that the top is restrained from sideways movement. Nuts 809 are backed-off, thus door-set 804 is fixed vertically and horizontally to landing 803, but is only restrained horizontally at the top.

The second option is like the first option, but in order to remove the need for a complex access and fixing within the core, the door-set base member is adapted so that it may be attached to the landing slab from the landing side. This is shown in FIG. 8B. Adapted door-set bottom member 806 has a flat face to engage with the flange of angle 817. Angle 817 is fixed to member 806 using bolts 819. The angle is then fixed to slab 803 using fixing 818. Threshold 813 is fitted and screed 814 completed. Angle 817 is sized to take the weight of the door-set plus any threshold loads. Note that once the angle is fixed, nuts 809 and 810 must be backed off to allow the frame 807 to move relative to door-set 804.

Where the method of FIG. 7B is used, it is not necessary to fix the door-set to the concrete core as relative movements can be accommodated. However, it may be advantageous to use the fixing method of FIG. 8B as this prevents any relative movement between the concrete core and the lift frame.

Owing to tolerances in the concrete construction, the methods of both FIGS. 7A and 7B require the doors to have a vertical adjustment. In the case of 7A, the length of adjustment provided by threaded bar 808 must accommodate both long term vertical movement and construction tolerances. In the case of FIGS. 7B, only construction tolerances need to be accommodated. This allows a more compact detail that will work for all heights of building—in the case FIGS. 7A/8A the required adjustment on threaded bar 808 will be a function of core height and age of core at time of lift frame installation.

Where steel frames are fixed to the concrete core as in FIG. 7B, then as the core axially shortens so load would be transferred into the steel frame. To counteract this effect, once a steel frame has been fixed to the core at the frame mid height, the nut associated with the cone detail should be backed off, e.g., by 4 mm per number of storey's in the frame. This allows each steel frame to move vertically with the core and independently from one another. Plan positions may still held by the stabilisers and fixtures.

The method of 7B may be considered preferable. Below is a summary of the benefits this method brings: assuming constant storey to storey height, each intermediate module comprising steel frame with guide rails and doors will be identical to the extent that modules may be interchanged; identical modules will have the same centre of gravity. The lifting arrangements (e.g. chain lengths) can therefore be pre-set and identical for each module, saving crane time; the system is applicable to all core types, whether newly built or pre-existing, slipped or jumped; as each module is installed, it may be accurately set in position, locked off to the core and door thresholds and reveals completed. There is no need to go back and make any further adjustment to allow for vertical movement; and work in the shaft is both standardised and minimised, resulting in both speed and quality. In particular crane operations are minimised and substantially decoupled from the lift installation except when a lift frame is to be installed.

Some of the above benefits make it economic and practical to develop componentry that further simplifies and speeds up installation. These are described below:

The first disclosed is a lifting frame. The centre of gravity of a module is offset from the centre. During lifting the box shape of the steel frame may distort as there is no plan bracing. This can be prevented by attaching diagonals across the top. These fix to the M30 stabbing bolts. If the diagonals are of sufficient size, they can be used to form the braces of a lifting frame. In this manner the lifting frame serves the dual purpose of stiffening the module and providing a point for attachment of the crane.

There is next disclosed an arrangement for weather sealing. A shaft may need to be left open at the top. It is not desirable for rainwater to pass down the shaft into the zone that is already completed. A panel may be attached to the top of the module using the M30 stabbing bolts. A temporary seal bridges the gap between the concrete wall and the panel to intercept water running down the wall of the shaft. The seal may be a rubber lip or made using an adhesive sealing tape. The panel is shaped so as to direct any water to a central sump where any water collects. The sump may either be pumped out or an outlet with tap provided enabling the water to be drained from under. The panel needs to be strong enough to walk on so that seals can be fitted and hooks disconnected.

There is next disclosed a crash deck. When a shaft is left open, there is risk of items accidentally falling down the shaft. If people are working on installing modules lower down the shaft, this presents an unacceptable risk. Normal practice is to provide a crash deck, designed to absorb the energy of any falling objects. Subject to the energy of the falling object, it is possible to attach the crash deck to the M30 stabbing bolts. This would transfer loads into the corner members of the steel frames and thereby into the concrete wall. For larger energies, the crash deck may be designed to absorb the energy, reducing the reaction forces to a value that can be taken by the steel frame corner members. In extreme circumstances, the steel frame can help absorb energy, but if damaged beyond repair the steel frame would require replacement All the above items may not be known in association with being supported by a frame.

It may be more efficient if the three functions above can be combined into a single piece of equipment. This is technically possible and is therefore considered an innovative feature of the system. A typical installation sequence would be as follows:

An integrated lifting frame is attached to the top of a module whilst the module is on the trailer. A feature is built into the integrated lifting frame to allow it to be handled in a vertical orientation so that it can be attached to a horizontal module frame.

The crane upends the module off the back of the wagon. Pre-set sling lengths provided with the lifting frame ensure a straight lift. A pivot point engaging with holes in the base of the steel frame and clamped to the bed of the wagon prevents uncontrolled longitudinal or lateral sliding during the upending process.

The module is lifted and placed into the shaft. The lifting frame may include rollers or skids so that these are not required at the top of the module. The module is lowered until it sits on a lower module.

Access to the integrated lifting frame is achieved from the landing aligned with the top of the module. The integrated lifting frame top surface is near level with the landing.

If there are subsequent modules to be installed immediately, an operative disconnects the lifting frame from the top of the lower module. The lifting frame is craned out of the shaft, rotated to vertical and attached to the top of the next module.

If there is a gap in module installation activities, then the operative disconnects the crane hook from the integrated lifting frame which then remains in the shaft to act as a weather seal and crash deck. An operative will need to seal the gap between the shaft walls and integrated lifting frame.

On re-starting installation, the crane hook will need to be lowered down the shaft to retrieve the integrated lifting frame, otherwise operations proceed as above.

Figure 9:
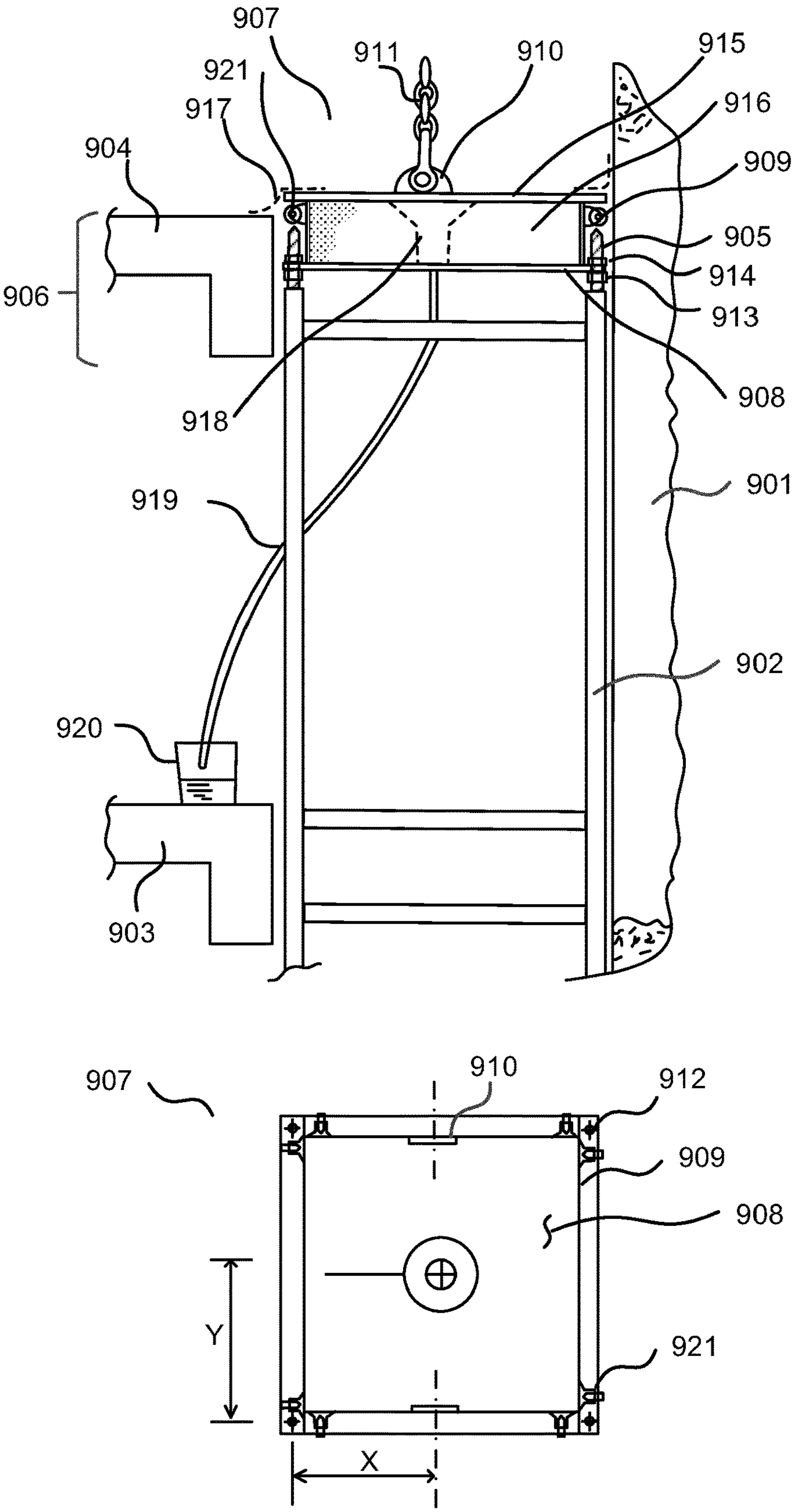
FIG. 9 shows a cross-section view of an integrated lifting frame weather seal crash deck.

An example of the proposed integrated lifting frame weather seal crash deck (LWC) is shown in FIG. 9. The shaft wall 901 runs close to the steel frame 902. Lower landing 903 and upper landing 904 define the door opening of the shaft. The break point between modules, represented by threaded cones 905 lies in the lintel zone 906 above a structural door opening.

LWC 907 comprises of a lower steel plate 908 with stiffener plates 909 welded to it. The plates parallel to the x-axis have a lifting eye 910 welded to them. Lifting tackle 911 is connected to this lifting eye.

Plate 908 has a hole 912 in each corner. The hole positions correspond accurately to the location of threaded cone 905. The assembly 907 is placed over the threaded cones 905. Lower nuts 913 are wound up until they just touch the LWC. Upper nuts 914 are then started, screwed down and tightened so that assembly 907 is rigidly attached to the top of frame 902.

Dimension x is set so that the centre of lift lies directly over the centre of gravity of the combined module and LWC. Chain lengths 911 are similarly adjusted so that the centre of lift lies in the correct y position. Since the LWC weight is significant relative to the steel frame (>20%), the CoG must be that of the combined system.

The crash deck is provided by an impact resistant board 915 overlying a crushable material 916. The board may be ply or a reinforced rubber. The board may have a hinged cover in each corner in order to give access to nuts 914. The crushable material may be an organic material such as expanded polystyrene or an inorganic material such as foamed concrete. Board 915 is fixed to steel members 909 so that they can't come loose.

Wind blown rain can be expected to run down the inside of shaft 901. Self-adhesive flashing tape 917 is fixed to deflect water onto board 915 and thereby towards funnel 918. A gradient may be formed on boards 915 to facilitate flow. Water can either be collected in sump 918 or it may be drained via hose 919 into bucket 920.

Removal of the LWC involves cutting the flashing tape, raising the hinged corner flaps and undoing the four corner nuts.

The LWC may additionally be provided with skids or rollers 921 to engage with the concrete wall 901. This can be in lieu of skids or rollers on the top of the steel frame.

Access platforms may be required within the shaft in order to access the following: M30 nuts associated with the stabbing detail; stabilisers that screw out to fix plan position relative to the shaft walls; vertical support brackets; joint line between vertically aligned guide rails; vertical and horizontal landing door adjustment; fine adjustment of guide rail brackets should movement have occurred; and/or electrical connections.

These platforms may be pre-fitted in each module. The steel frame may include brackets to support the platforms. Platforms need to be designed so that they can be safely removed through an open lift door. Ideally removal is non-destructive so that platforms can be re-used.

The access platforms can serve a second purpose. By attaching them to the frame by e.g., friction grip bolts, they can be used to help lock-in the shape of the module during transport and installation. The additional bracing they provide may be used to reduce the member sizes in the permanent steel frame.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method for installing a modular lift within a shaft, comprising:

inserting a frame of the lift within the shaft, the frame comprising one or more stabilisers, arranged in an orthogonal orientation in relation to a longitudinal axis of the frame and protruding from the frame at an adjustable distance;

adapting the one or more stabilisers to contact an internal face of the shaft by setting the adjustable distance; wherein the frame is held in position by the forces exerted through the stabilisers.

2. The method of claim 1, wherein the frame comprises one or more guide rail brackets, guide rails, door brackets, and/or door sets, or combinations thereof.

3. The method of claim 1, wherein the frame comprises a vertical adjustment mechanism.

4. The method of claim 1, wherein the frame further comprises one or more brackets operable to fix the frame to the internal face of the shaft.

5. The method of claim 1, further comprising:

inserting a subsequent frame of the lift within the shaft, the subsequent frame comprising one or more stabilisers and one or more brackets;

adjusting one or more vertical connecting elements to fix the subsequent frame in vertical alignment with the frame;

adapting the one or more stabilisers to contact an internal face of the shaft;

fixing the subsequent frame to an internal face of the shaft using one or more brackets, wherein the subsequent frame is held in position by the forces exerted through the one or more brackets; and removing the one or more vertical connecting elements.

6. The method of claim 1, wherein the one or more stabilisers comprise;

a pad screwed out from the frame;

a pad screwed out from the frame with an adhesive applied to the pad;

a glue between the frame and the shaft;

a screw angle bracket between the frame and the shaft;

a slotted hole assembly comprising one or more sliding parts; or combinations thereof.

7. The method of claim 1, wherein the frame further comprises a lift car.

8. The method of claim 1, wherein the shape of the frame remains substantially unchanged during the installation process.

9. The method of claim 1, wherein the one or more stabilisers are further operable to exert sufficient pressure on the internal face of the shaft so as to adjust the frame to a predetermined shape.

10. A frame for a modular lift, comprising:

one or more stabilisers protruding from the frame at an adjustable distance, the one or more stabilizers operable to contact an internal face of a shaft, wherein in use the frame is held in position by the forces exerted through the stabilisers, and further wherein, the stabilizers are arranged in an orthogonal orientation in relation to a longitudinal axis of the frame; and the one or more stabilisers protrude from the frame at an adjustable distance settable in use such that the stabilizers contact the internal face of the shaft.

11. The frame of claim 10, further comprising one or more fittings for:

one or more guide rail brackets;

one or more guide rails;

one or more door brackets;

one or more door sets; or combinations thereof.

12. The frame of claim 10, further comprising rollers, skids, or combinations thereof.

13. The frame of claim 10, further comprising one or more access platforms.

14. The frame of claim 13, wherein the one or more access platforms provide reinforcement to the structure of the frame.

* * * * *